United States Patent
Tsuchiya et al.

(10) Patent No.: US 12,455,711 B2
(45) Date of Patent: Oct. 28, 2025

(54) INFORMATION PROCESSING DEVICE AND INFORMATION PROCESSING METHOD

(71) Applicant: CANON KABUSHIKI KAISHA, Tokyo (JP)

(72) Inventors: Takumi Tsuchiya, Kanagawa (JP); Minoru Sakaida, Kanagawa (JP); Tsuyoshi Mima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/752,107

(22) Filed: Jun. 24, 2024

(65) Prior Publication Data

US 2025/0004684 A1 Jan. 2, 2025

(30) Foreign Application Priority Data

Jun. 27, 2023 (JP) .................................. 2023-104852

(51) Int. Cl.
*G06F 3/14* (2006.01)
*G06V 10/24* (2022.01)
*G06V 40/20* (2022.01)

(52) U.S. Cl.
CPC ................ *G06F 3/14* (2013.01); *G06V 10/24* (2022.01); *G06V 40/28* (2022.01)

(58) Field of Classification Search
CPC ........... G06F 3/14; G06V 10/24; G06V 40/28
See application file for complete search history.

(56) References Cited

U.S. PATENT DOCUMENTS

| | | | | |
|---|---|---|---|---|
| 9,076,033 B1* | 7/2015 | Barron | .................... | G06F 3/005 |
| 10,803,668 B2* | 10/2020 | Jones | .................... | G02B 27/017 |
| 2016/0203360 A1* | 7/2016 | Alvarez | ................. | G06V 40/28 |
| | | | | 345/156 |
| 2022/0103748 A1* | 3/2022 | Canberk | ............... | G06V 40/107 |
| 2022/0239828 A1 | 7/2022 | Tanaka et al. | | |
| 2023/0078183 A1* | 3/2023 | Wang | ..................... | G06V 40/28 |
| | | | | 715/863 |
| 2023/0154134 A1* | 5/2023 | Oh | ......................... | G06V 20/20 |
| | | | | 382/103 |
| 2023/0244318 A1 | 8/2023 | Suetomi | | |

FOREIGN PATENT DOCUMENTS

| | | |
|---|---|---|
| JP | 2009-010987 A | 1/2009 |
| JP | 2022-006502 A | 1/2022 |

\* cited by examiner

*Primary Examiner* — Premal R Patel
(74) *Attorney, Agent, or Firm* — Venable LLP

(57) ABSTRACT

An information processing device is capable of causing a user to visually recognize a real space via a display. The information processing device recognizes a particular hand gesture performed by the user. The information processing device 1) displays a first frame in accordance with the particular hand gesture on the display, and 2) continues displaying the first frame for at least a predetermined amount of time after the particular hand gesture is recognized, even in a case where a state transitions to a state where the particular hand gesture is not recognized after the first frame is displayed The information processing device, in a state where the first frame is displayed on the display, executes particular processing with regard to a range of the real space indicated by the first frame out of the real space.

19 Claims, 14 Drawing Sheets

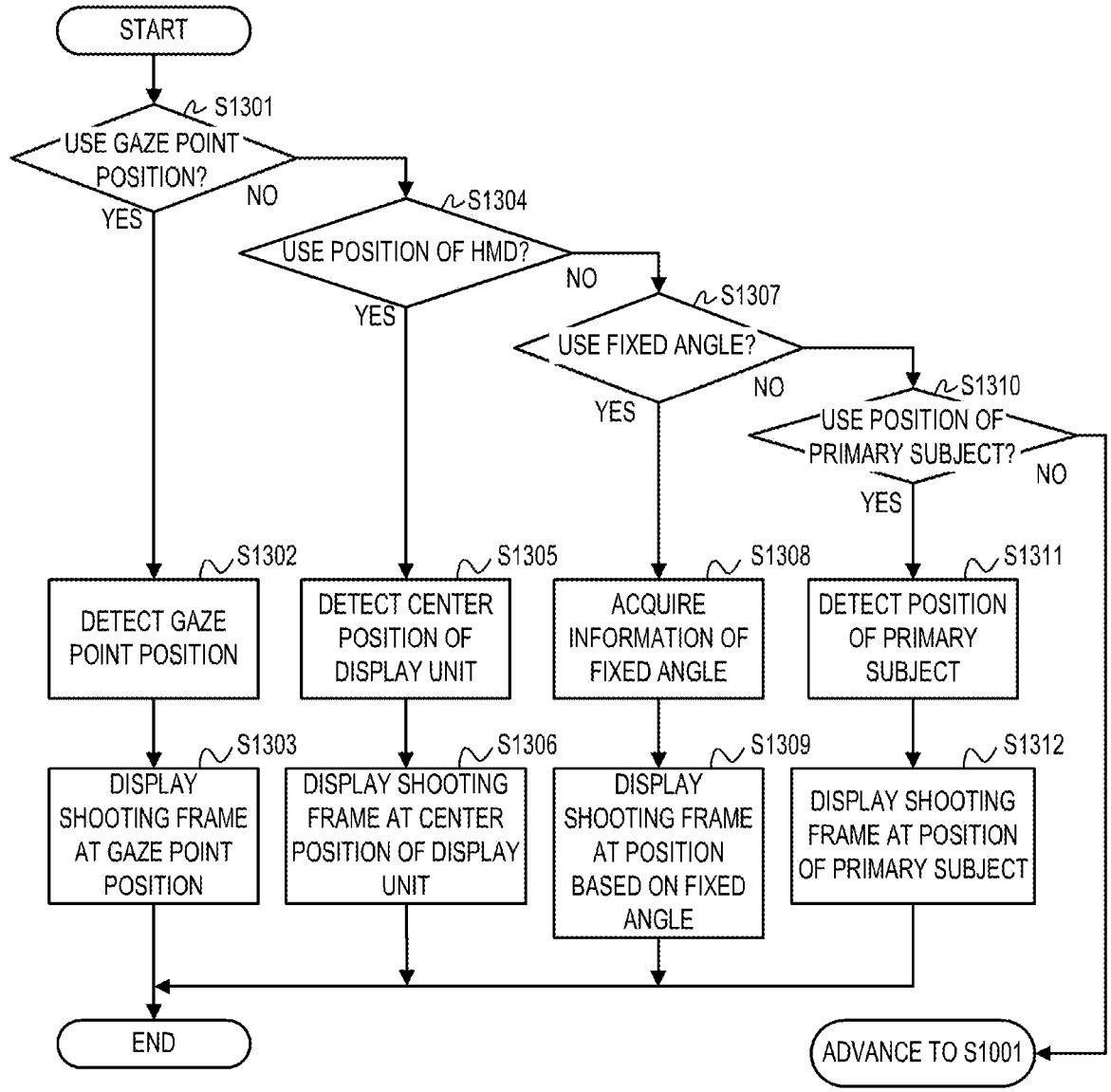

INFORMATION PROCESSING DEVICE AND INFORMATION PROCESSING METHOD

BACKGROUND OF THE INVENTION

Field of the Invention

The present invention relates to an information processing device and an information processing method.

Description of the Related Art

In recent years, there is technology such as augmented reality (AR), mixed reality (MR), and so forth. In these technologies, equipment such as head-mounted displays (HMD), camera-equipped smartphones, tablet terminals, and so forth, is used. Using cameras of such equipment enables images to be generated in which virtual objects are superimposed on real space.

In Japanese Patent Application Publication No. 2022-6502, a user wearing an HMD performs a hand gesture of making a trimming pose (finger frame) in front of him/herself, whereby a shooting frame determined by the hand gesture is displayed in AR space that the user is viewing. A camera installed in the HMD then acquires an image of a range indicated by this shooting frame. This approach using hand gestures enables an angle of view to be determined by intuitive operations, and accordingly the user can easily perform shooting.

However, the technology in Japanese Patent Application Publication No. 2022-6502 necessitates the user to form the trimming pose by hand gestures at the timing of shooting. Accordingly, the arms of the user may become fatigued by the timing of shooting arriving, resulting in the position of the shooting frame changing due to thus becoming fatigued.

Also, in a case of forming a trimming pose in AR space, shadows from the hands of the user may appear on a subject. Accordingly, there have been situations in which processing intended by the user could not be carried out.

SUMMARY OF THE INVENTION

Accordingly, it is an object of the present invention to enable realization of processing intended by the user through particular hand gestures.

An aspect of the present invention is an information processing device that is capable of causing a user to visually recognize a real space via a display, the information processing device including at least one processor capable of causing the information processing device to perform recognizing processing to recognize a particular hand gesture performed by the user, perform display control processing to 1) display a first frame in accordance with the particular hand gesture on the display, and 2) continue displaying the first frame for at least a predetermined amount of time after the particular hand gesture is recognized, even in a case where a state transitions to a state where the particular hand gesture is not recognized after the first frame is displayed, and in a state where the first frame is displayed on the display, execute particular processing with regard to a range of the real space indicated by the first frame out of the real space.

An aspect of the present invention is an information processing method that is capable of causing a user to visually recognize a real space via a display, the information processing method including: recognizing a particular hand gesture performed by the user; performing display control of 1) displaying a first frame in accordance with the particular hand gesture on the display, and 2) continuing displaying the first frame for at least a predetermined amount of time after the particular hand gesture is recognized, even in a case where a state transitions to a state where the particular hand gesture is not recognized in the recognizing after the first frame is displayed; and performing processing of, in a state where the first frame is displayed on the display, executing particular processing with regard to a range of the real space indicated by the first frame out of the real space.

Further features of the present invention will become apparent from the following description of exemplary embodiments with reference to the attached drawings.

BRIEF DESCRIPTION OF THE DRAWINGS

FIG. 13 is a flowchart of shooting frame layout processing according to the third embodiment.

DESCRIPTION OF THE EMBODIMENTS

Embodiments of the present invention will be described below with reference to the attached drawings.

First Embodiment

Figure 1:
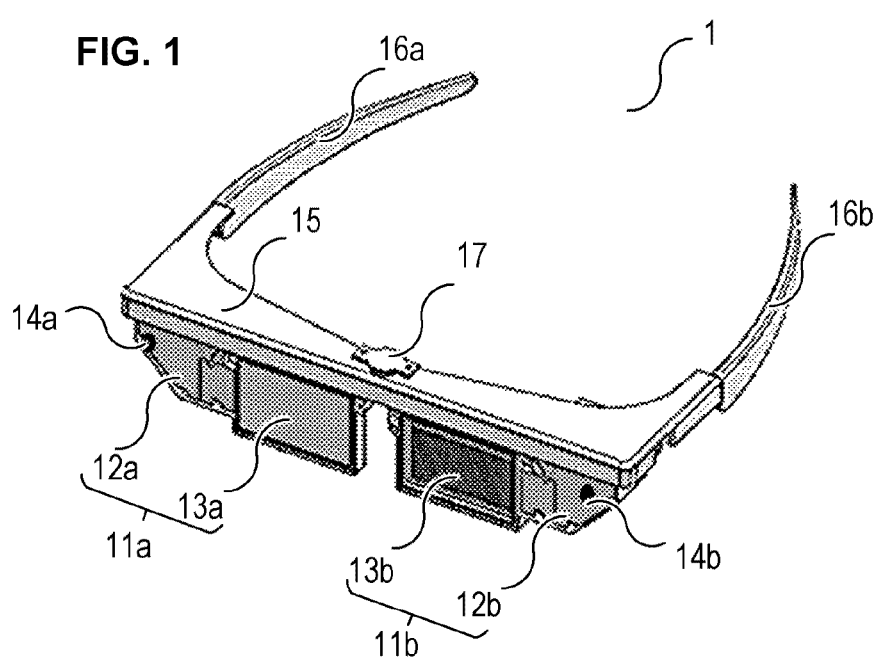
FIG. 1 is an external view of an HMD according to a first embodiment.
Figure 2:
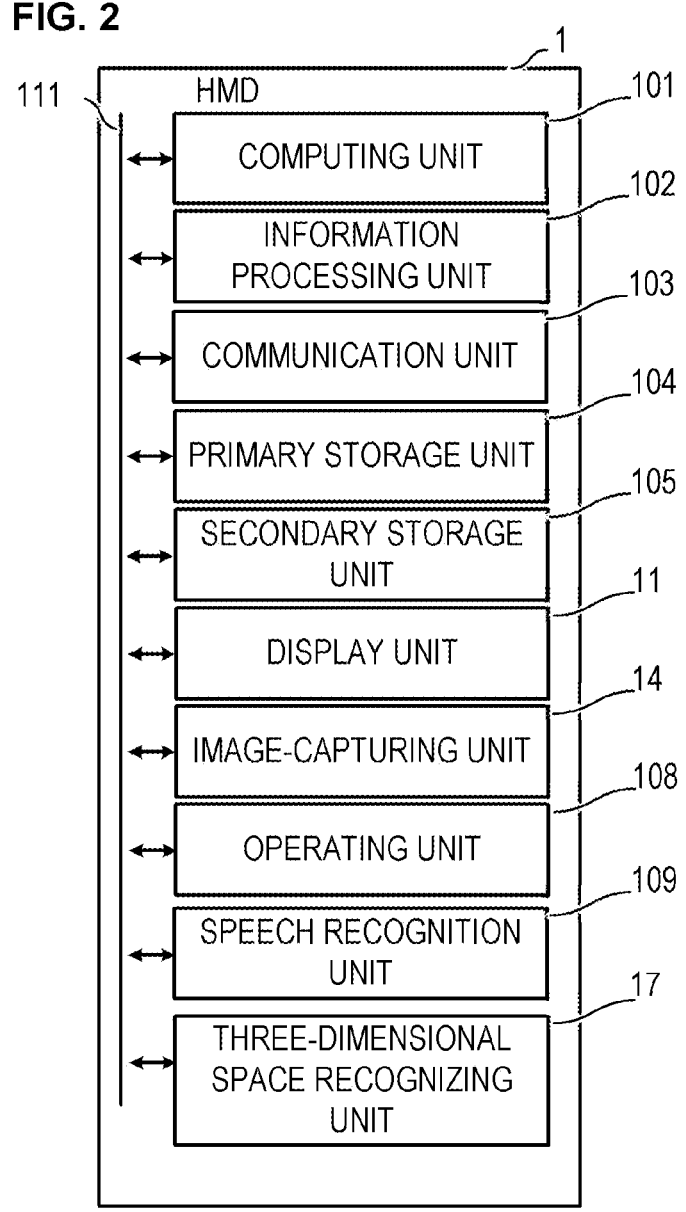
FIG. 2 is a hardware configuration diagram of the HMD according to the first embodiment.

FIG. 1 illustrates an external perspective view of a HMD 1 that is an optical see-through-type display device according to a first embodiment. Also, FIG. 2 illustrates a hardware configuration of the HMD 1. Components that are denoted by the same signs in FIGS. 1 and 2 are the same components.

The HMD 1 is an information processing device (electronic equipment) by which a user experiences augmented reality (AR) space. As illustrated in FIG. 1, the HMD 1 has a display unit 11 (display unit 11a and display unit 11b), an image-capturing unit 14 (image-capturing unit 14a and image-capturing unit 14b), a three-dimensional space recognizing unit 17, and a frame.

The display unit 11 has an image projecting unit 12 and a light guide unit 13. Light from a display element (omitted from illustration) of the display unit 11*a* is guided to the right eye of the user wearing the HMD 1 by an image projecting unit 12*a* and a light guide unit 13*a*. In the same way, light from a display element (omitted from illustration) of the display unit 11*b* is guided to the right eye of the user wearing the HMD 1 by an image projecting unit 12*b* and a light guide unit 13*b*. The user can perceive images displayed on the display unit 11*a* and the display unit 11*b*, and incident light (light from a subject) from in front of the HMD 1 at the same time.

The image-capturing unit 14*a* and the image-capturing unit 14*b* each shoot (image-capture) real space around the HMD 1 (including ahead).

The three-dimensional space recognizing unit 17 acquires information of distance to objects (distance information) around the HMD 1 (including ahead), and generates three-dimensional space information. Also, in the first embodiment, the HMD 1 is an optical see-through-type HMD that uses transparent displays. However, the HMD 1 may be a video see-through-type HMD that uses non-transparent displays.

The frame has a rim 15, a temple 16*a*, and a temple 16*b*. The display unit 11 (display unit 11*a* and display unit 11*b*) is joined to a lower face of the rim 15. The temple 16*a* and the temple 16*b* are joined to respective sides of the rim 15.

As illustrated in FIG. 2, the HMD 1 has a computing unit 101, an information processing unit 102, a communication unit 103, a primary storage unit 104, a secondary storage unit 105, the display unit 11, the image-capturing unit 14, an operating unit 108, a speech recognition unit 109, and the three-dimensional space recognizing unit 17. The components of the HMD 1 exchange data with each other via a bus 111. Note that the HMD 1 may have just the display unit 11 and the image-capturing unit 14. An information processing device (computer or the like) having the configurations illustrated in FIG. 2 besides the display unit 11 and the image-capturing unit 14 may control the HMD 1.

The computing unit 101 is a control unit that controls the other components. The computing unit 101 performs, for example, display control of the display unit 11. The computing unit 101 is, for example, a central processing unit (CPU).

The information processing unit 102 performs, for example, various types of computation processing (computation processing using images acquired by the image-capturing unit 14, computation processing using various types of evaluation values acquired by the image-capturing unit 14, and computation processing using data acquired by the three-dimensional space recognizing unit 17).

The communication unit 103 communicates with external equipment and so forth.

The primary storage unit 104 temporarily stores data that the computing unit 101 and the information processing unit 102 use. The primary storage unit 104 is, for example, dynamic random access memory (DRAM).

The secondary storage unit 105 stores data that the computing unit 101 and the information processing unit 102 use. The secondary storage unit 105 also stores recorded images that are processed (encoded) by the information processing unit 102, and so forth. The secondary storage unit 105 is, for example, flash memory or the like.

The display unit 11 includes a display for the right eye (display unit 11*a*) and a display for the left eye (display unit 11*b*). The two displays can each display images.

The image-capturing unit 14 converts images obtained by collecting and imaging incident light from the subject into digital data. Thus, the image-capturing unit 14 acquires shot images in which the subject (real space) has been shot.

The operating unit 108 is an operating member (button, dial, or the like) that accepts operations from the user. The operating unit 108 may include two or more operating members. Also, the operating unit 108 may be installed in external equipment that is communicable with the HMD 1 via the communication unit 103, rather than being installed in the HMD 1.

The speech recognition unit 109 acquires external speech using a microphone or the like.

The three-dimensional space recognizing unit 17 acquires distance information and position coordinate information of the real space, using a distance sensor or the like.

Figure 4A:
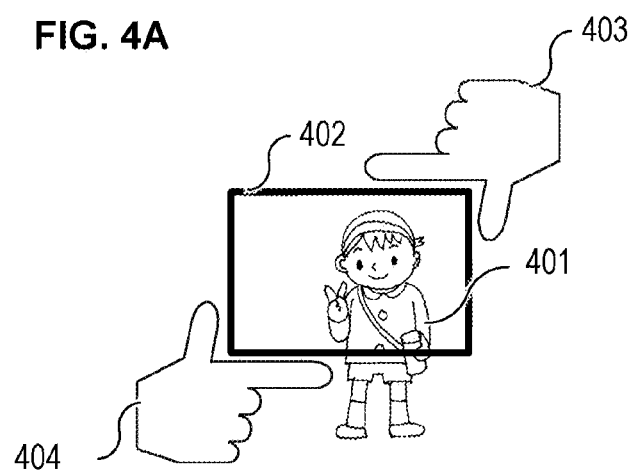
FIGS. 4A and 4B are diagrams for describing a shooting frame according to the first embodiment.
Figure 4B:
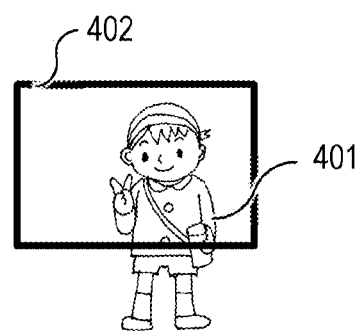
Figure 5A:
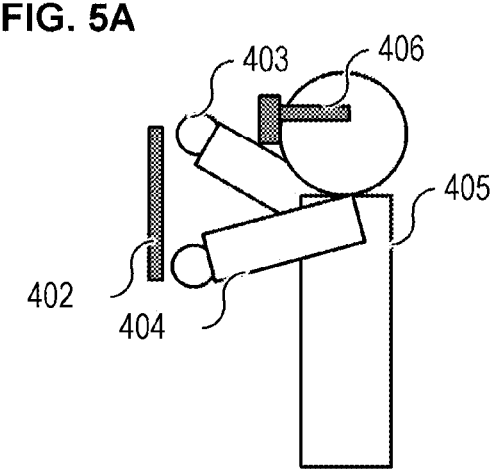
FIGS. 5A and 5B are diagrams illustrating relations between the shooting frame according to the first embodiment and a user.
Figure 5B:
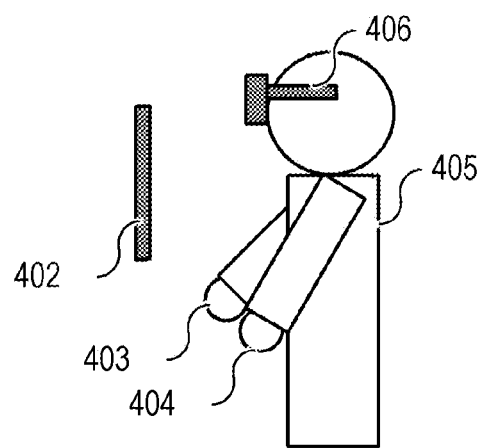

Shooting control by hand gestures according to the first embodiment will be described with reference to FIG. 3 and FIGS. 4A and 4B and FIGS. 5A to 5B. Also, FIGS. 4A and 4B and FIGS. 5A and 5B are schematic diagrams illustrating a relation between positions of the hands of a user 405 and a position of a shooting frame 402 in a space expressed by display on the display unit 11 (AR space, i.e., space in which real space and virtual objects are merged). FIGS. 4A and 4B are schematic diagrams of the shooting frame 402 as viewed from the user 405 wearing the HMD 1. FIGS. 5A and 5B are schematic diagrams viewing the user 405 wearing the HMD 1 and the shooting frame 402 from the side thereof.

Figure 3:
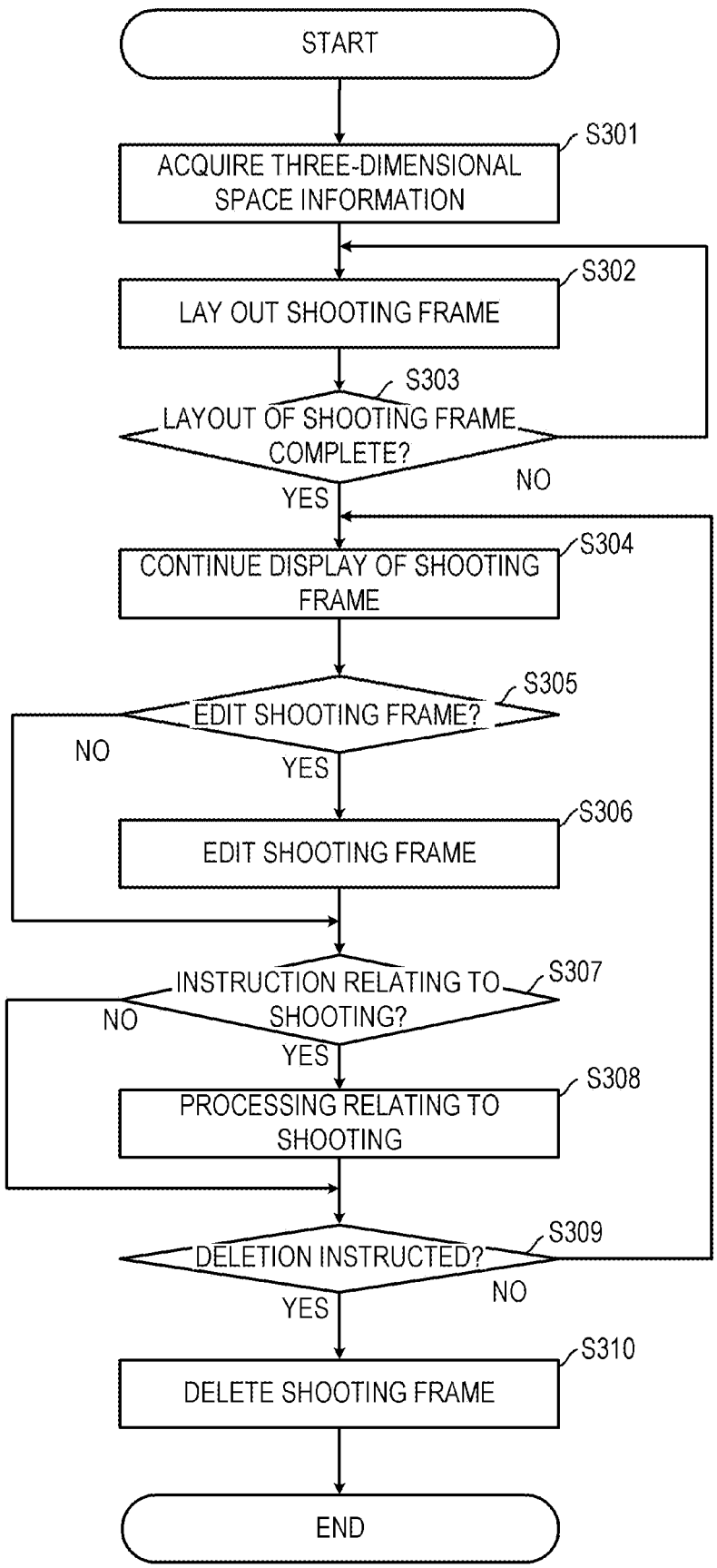
FIG. 3 is a flowchart of shooting control processing according to the first embodiment.

Processing of the flowchart in FIG. 3 is started upon the user 405 operating the operating unit 108 of the HMD 1 and the HMD 1 being set to shooting mode. Each of the processing in the flowchart in FIG. 3 is realized by the computing unit 101 of the HMD 1 executing a program. Note that the processing described as being executed by the computing unit 101 in each step of the flowchart in FIG. 3 may be executed by the information processing unit 102.

In step S301, the computing unit 101 controls the three-dimensional space recognizing unit 17 to acquire information of layout of objects in the real space, and information regarding distance from the HMD 1 to the objects and so forth, as three-dimensional space information. The computing unit 101 holds the three-dimensional space information in the primary storage unit 104.

In step S302, the computing unit 101 recognizes (detects) hand gestures of the user 405 on the basis of the three-dimensional space information. In a case where a pose representing a range for trimming (a trimming pose) is made by a right hand 403 and a left hand 404, as illustrated in FIGS. 4A and 5A, the computing unit 101 then generates the shooting frame 402 according to a "rectangle defined by a diagonal line connecting the right hand 403 and the left hand 404". Note that the trimming pose may be any pose as long as the pose is capable of identifying a range to a certain extent. For example, the trimming pose may be a pose in which a circle is made by the thumb and index finger of one hand.

Also, the computing unit 101 holds information of the shooting frame 402 (information of position, orientation, and shape) in the primary storage unit 104, and outputs the information of the shooting frame 402 to the display unit 11. Thus, the computing unit 101 can make a display as if the shooting frame 402 were superimposed on the real space (AR space that the user visually recognizes via the display unit 11) on the display unit 11. Thus, the computing unit 101 can display the shooting frame 402 on the display unit 11 such that the user 405 can perceive that the shooting frame 402 is displayed at the position of the hand gesture for the trimming pose in the real space. In FIG. 4A, the shooting frame 402 is superimposed on a subject 401 that is present in the real space. Note that in the first embodiment, information of the shooting frame 402 (information of position, orientation, and shape) matches the information of the rectangle defined by the information formed by the user 405 (information of position, orientation, and shape in the AR space).

In a predetermined case, the computing unit 101 then finalizes (completes) layout of the shooting frame 402 that is displayed. An example of the predetermined case is a case where a predetermined operation is performed on the operating unit 108, or the speech recognition unit 109 acquires predetermined speech (sound; voice) from the user 405. Examples of the predetermined case may include a case where the user 405 makes a particular action by a hand gesture, or a case where a predetermined amount of time elapses after stopping the hand gesture.

In step S303, the computing unit 101 determines whether or not the layout of the shooting frame 402 has been completed. In a case of determining that the layout of the shooting frame 402 has been completed, the flow advances to step S304. In a case of determining that the layout of the shooting frame 402 has not been completed, the flow advances to step S302.

In step S304, the computing unit 101 continues to display the shooting frame 402 on the display unit 11. At this time, the shooting frame 402 continues to be displayed even after the hand gesture of the trimming pose ends (after changing to a state where the hand gesture of the trimming pose is not recognized), as illustrated in FIGS. 4B and 5B.

In step S305, the computing unit 101 determines whether or not an instruction relating to editing (instruction by the user 405) has been detected. In a case where determination is made that an instruction relating to editing has been detected, the flow advances to step S306. In a case where determination is made that an instruction relating to editing has not been detected, the flow advances to step S307.

In step S306, the computing unit 101 edits the shooting frame 402 (position, orientation, and shape of the shooting frame 402) in accordance with instruction by operations at the operating unit 108 or instructions by speech from the user 405, for example. Alternatively, the computing unit 101 may edit the shooting frame 402 in accordance with a hand gesture (action) of grabbing the shooting frame 402 by the right hand 403 (or the left hand 404) of the user 405, or the like.

In step S307, the computing unit 101 determines whether or not an instruction relating to shooting has been detected. In a case where determination is made that an instruction relating to shooting has been detected, the flow advances to step S308. In a case where determination is made that an instruction relating to shooting has not been detected, the flow advances to step S309. In step S307, the shooting frame 402 continues to be displayed even after the hand gesture of the trimming pose ends. Accordingly, the user 405 can perform instructions relating to shooting, freely using the right and left hands.

In step S308, the computing unit 101 performs processing in accordance with instructions relating to shooting. For example, the computing unit 101 performs shooting of the range in real space indicated by the shooting frame 402, by the image-capturing unit 14, in accordance with instructions by operations at the operating unit 108 or speech of the user 405 (instructions by speech uttered by the user). The computing unit 101 may perform shooting of the range of the real space indicated by the shooting frame 402 using the image-capturing unit 14, in accordance with a hand gesture instructing shooting by the right hand 403 or the left hand 404 of the user 405. Also, the computing unit 101 performs image processing with regard to shot images that are shot of the range of the real space that the shooting frame 402 indicates. Note that in steps S307 and S308, shooting may be performed in accordance with a particular condition being satisfied, regardless of instructions relating to shooting. For example, the computing unit 101 may shoot the range in real space indicated by the shooting frame 402 by the image-capturing unit 14, in accordance with a certain amount of time elapsing after display of the shooting frame 402 started.

In step S309, the computing unit 101 determines whether or not an instruction for deleting the shooting frame 402 has been detected. In a case where determination is made that an instruction for deleting the shooting frame 402 has been detected, the flow advances to step S310. In a case where determination is made that an instruction for deleting the shooting frame 402 has not been detected, the flow advances to step S304.

In step S310, the computing unit 101 deletes the shooting frame 402. Specifically, the shooting frame 402 deletes the information of the shooting frame 402 from the primary storage unit 104, and also hides the shooting frame 402 displayed on the display unit 11 from view. Note that at the point of an instruction to delete the shooting frame 402 being detected, if a predetermined amount of time (e.g., five seconds) has not elapsed from the display of the shooting frame 402 starting, the computing unit 101 may delete the shooting frame 402 at a timing of the predetermined amount of time elapsing from the display of the shooting frame 402 starting. That is to say, the computing unit 101 controls the display unit 11 such that the display of the shooting frame 402 continues for at least the predetermined amount of time after the shooting frame 402 is displayed.

For example, the computing unit 101 deletes the shooting frame 402 in accordance with operations at the operating unit 108 or instructions by speech from the user 405. The computing unit 101 may delete the shooting frame 402 in accordance with a hand gesture instructing deletion of the shooting frame 402 by the right hand 403 or the left hand 404 of the user 405.

Note that in steps S309 and S310, the shooting frame 402 may be deleted (the shooting frame 402 may be hidden from view) in accordance with a particular condition being satisfied (at a timing of the particular condition being satisfied), regardless of instructions to delete the shooting frame 402. The computing unit 101 may delete the shooting frame 402 at a timing of the shooting frame 402 being displayed for a certain amount of time (e.g., ten seconds), or a timing of shooting by the image-capturing unit 14 being performed once. Also, the computing unit 101 may delete the shooting frame 402 at a timing of a primary subject 401 that was present in the range indicated by the shooting frame 402 moving away from this range. The computing unit 101 may delete the shooting frame 402 at a timing of the primary subject 401 that is present in the range indicated by the shooting frame 402 turning backwards, or a timing of the line of sight of the user 405 moving away from the shooting frame 402 (at a timing of the user 405 ceasing to watch the shooting frame 402).

Note that the primary subject 401 can be detected by technology for detecting a subject, which is known technology. Also, whether or not the primary subject 401 has turned backwards can be detected by face detection technology, which is known technology.

Also, the line of sight of the user 405 can be realized by installing a line-of-sight detection unit in the HMD 1. The line-of-sight detection unit is made up of a dichroic mirror, an imaging lens, a line-of-sight detection sensor, an infrared light-emitting diode, and so forth. The line-of-sight detection unit detects the position that the user 405 is viewing (gaze point position) on the display unit 11. The line-of-sight detection unit detects the gaze point using a method that is known as the Purkinje method, for example. The Purkinje method is a method that detects the orientation of the line of view, and the gaze point position, on the basis of "positional relation between reflected light, from infrared light emitted by an infrared light-emitting diode, which is reflected at the eyeball (particularly the cornea), and the pupil of the eyeball". There also are various other methods for detecting the orientation of the line of sight and the gaze point position, such as a method called the scleral reflection method, in which difference in reflectance of light between the iris and the sclera is utilized, and so forth. Note that line-of-sight detection methods other than the above may be used, as long as they are methods capable of detecting the orientation of the line of sight and the gaze point position.

Also, in the first embodiment, information of the shooting frame 402 (information of position, orientation, and shape) is held in the primary storage unit 104, and mapping is performed such that the shooting frame 402 is fixed at the same position in the AR space (real space). That is to say, even when the user 405 changes the orientation of his/her head, the shooting frame 402 is fixed at absolute coordinates of (x, y, z) in the AR space. Accordingly, the user 405 visually recognizes (perceives) the shooting frame 402 as being continuously displayed at the same position in the real space.

Figure 6A:
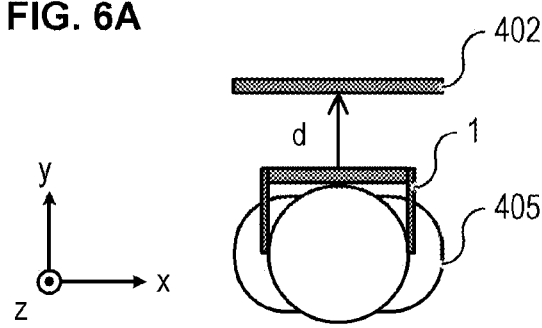
FIGS. 6A to 6C are diagrams illustrating relations between the shooting frame according to the first embodiment and the user.
Figure 6B:
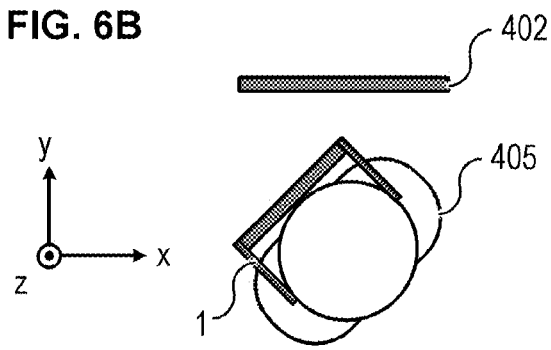

FIGS. 6A and 6B are diagrams viewing the HMD 1, the shooting frame 402, and the user 405 from above in the AR space. FIG. 6A illustrates a position of the shooting frame 402 before the user 405 changes the orientation of the head. FIG. 6B illustrates a position of the shooting frame 402 after the user 405 has changed the orientation of the head. The position of the shooting frame 402 is fixed at the position of the shooting frame 402 before the user 405 changes the orientation of the head, regardless of movement of the head of the user 405. This can be realized by the computing unit 101 changing the position of the shooting frame 402 on the display unit 11 in accordance with the movement of the head.

Figure 6C:
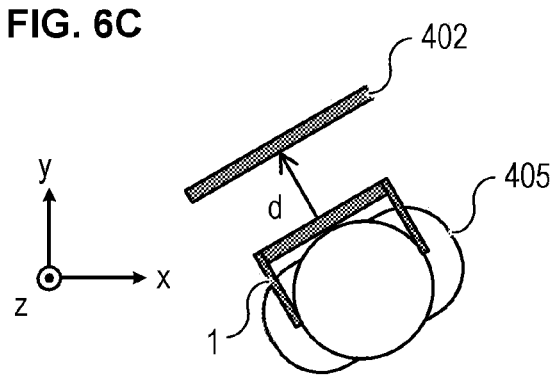

Conversely, the computing unit 101 may continue to display the shooting frame 402 such that the user 405 visually recognizes (perceives) the shooting frame 402 as moving in the real space in accordance with the movement of the head of the user 405. FIG. 6C illustrates a position of the shooting frame 402 after the user 405 has changed the orientation of the head from the state in FIG. 6A. The shooting frame 402 moves synchronously with the movement of the head of the user 405, while keeping a distance d as to the user 405 in the AR space. This can be realized by the computing unit 101 continuing to display the shooting frame 402 at the same position on the display unit 11. Further, the shooting frame 402 may dynamically move, so as to track the movement of the primary subject 401.

Also, in the first embodiment, the computing unit 101 or the information processing unit 102 that the HMD 1 has carries out calculation. However, in a case where there is a system (cloud) to which this HMD 1 can connect via the communication unit 103, this system may carry out calculation.

Also, in the first embodiment, a particular frame that indicates a range for executing particular processing may be used instead of the shooting frame 402 that is a frame for determining the angle of view for shooting. In this case, upon determination being made in step S307 that an instruction has been given for executing particular processing, the particular processing is executed in step S308. The particular processing is, for example, processing for capturing or translating text in the range of the real space indicated by the particular frame, or the like. An example of the particular processing is processing for performing autofocus (AF) with respect to the range of real space indicated by the particular frame.

Thus, according to the first embodiment, the HMD can continue to display the shooting frame for a predetermined amount of time after displaying the shooting frame in accordance with a hand gesture. Thus, the user no longer needs to continue a particular pose by hand gestures, thereby doing away with the shooting frame shaking, shadows from the hands appearing in the image, and so forth. Accordingly, an image of a composition that is in accordance with the intent of the user can be acquired.

Second Embodiment

An example in which the number of shooting frames to be laid out is one was described in the first embodiment. In a second embodiment, the HMD 1 recognizes a plurality of hand gestures for trimming poses, and lays out a plurality of the shooting frames. Description will be made in detail below regarding just points of difference between the second embodiment and the first embodiment.

Figure 8A:
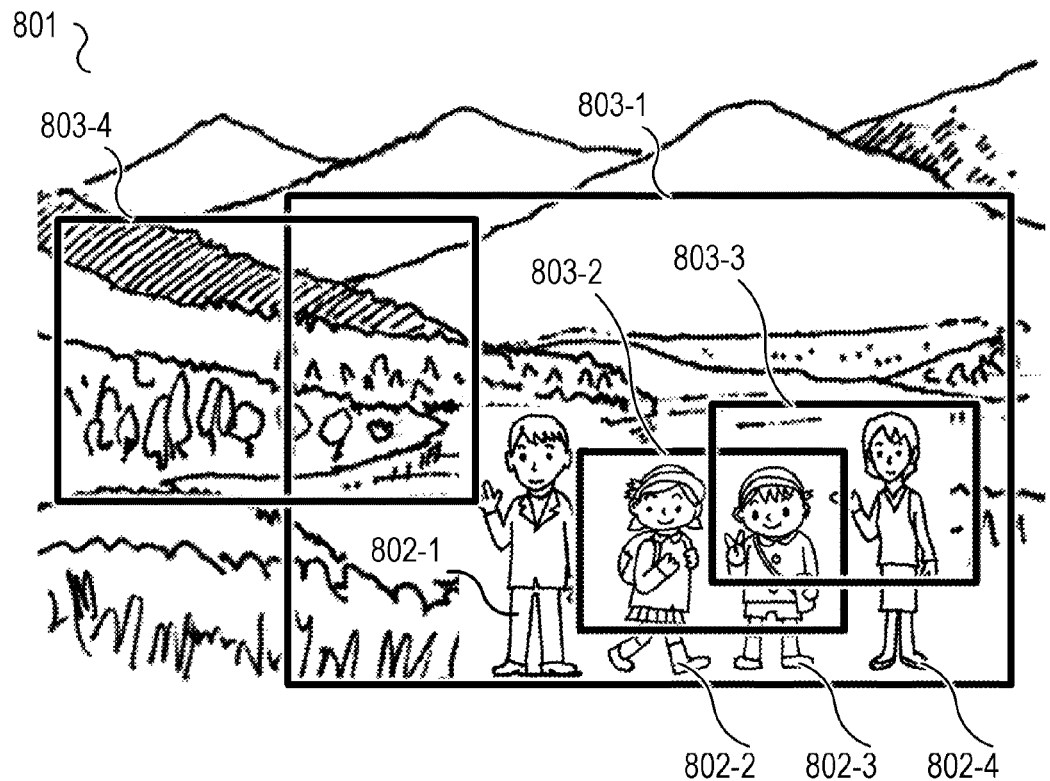
FIGS. 8A and 8B are diagrams for describing shooting frames according to the second embodiment.
Figure 8B:
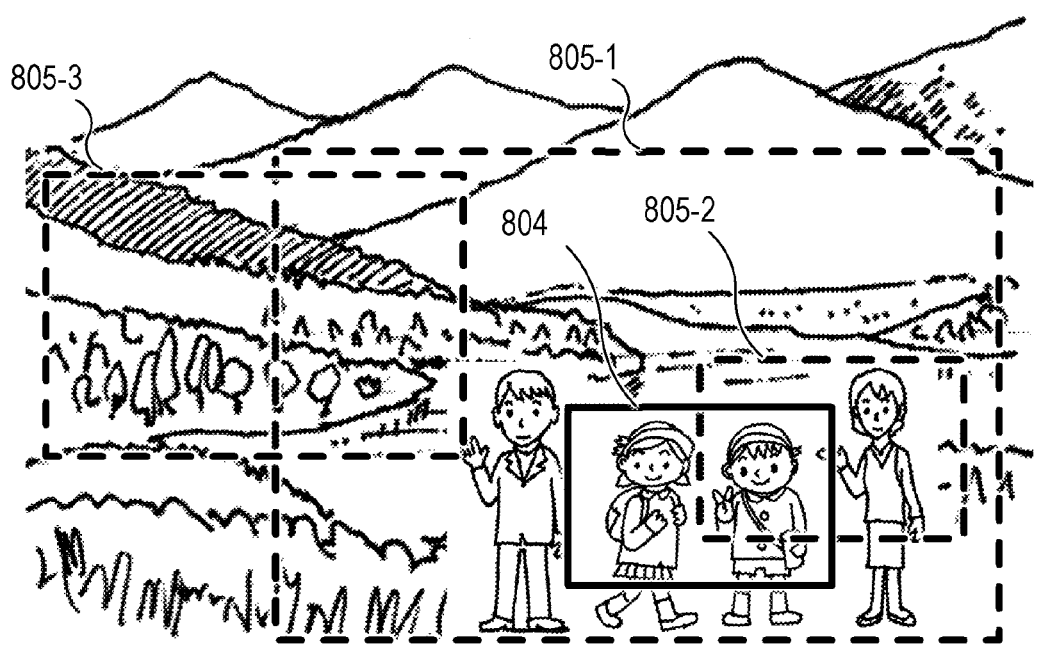

FIGS. 8A and 8B illustrate examples of layout of the plurality of shooting frames. FIGS. 8A and 8B both illustrate the display that the user 405 visually recognizes via the display unit 11. That is to say, FIGS. 8A and 8B are diagrams illustrating the AR space represented by display on the display unit 11. In FIG. 8A, a plurality of subjects 802 (subjects 802-1 to 802-4) and a plurality of shooting frames 803 (shooting frames 803-1 to 803-4) are present. An angle of view 801 is the angle of view of the HMD 1. In FIG. 8B, a shooting frame 804 that has been selected by the user, and shooting frames 805-1 to 805-3 that have not been selected by the user, are present.

Figure 7:
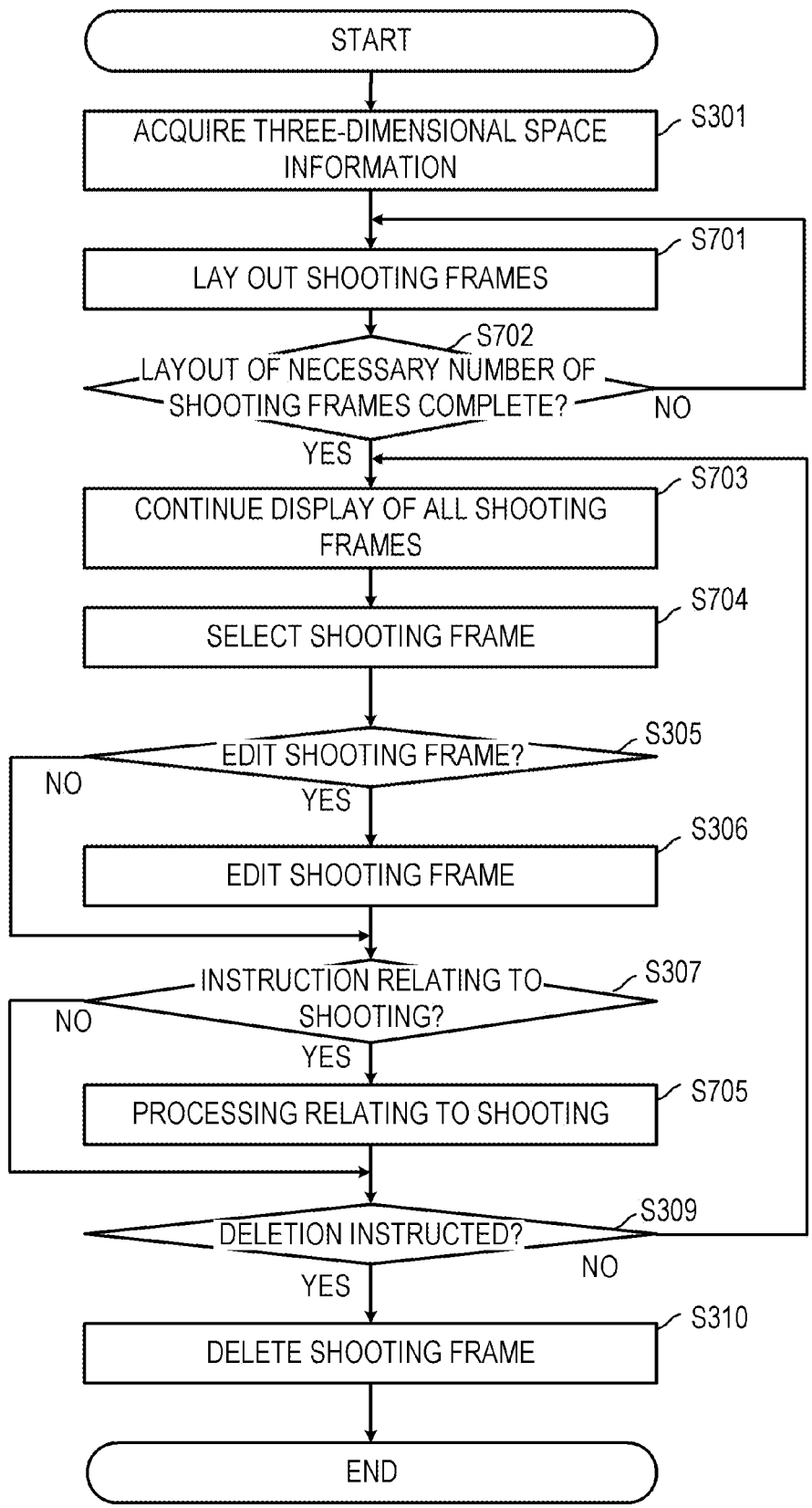
FIG. 7 is a flowchart of shooting control processing according to a second embodiment.

Shooting control by hand gestures according to the second embodiment will be described with reference to the flowchart in FIG. 7. Note that portions that are in common with the flowchart in FIG. 3 will be omitted from the description of the flowchart in FIG. 7.

In step S701, the computing unit 101 controls the three-dimensional space recognizing unit 17 by the same method as in step S302, and recognizes (detects) a hand gesture by the user 405. Thus, the computing unit 101 generates one shooting frame 803, and lays out one shooting frame 803.

In step S702, the computing unit 101 determines whether or not layout of a necessary number of shooting frames 803 has been completed. In a case where determination is made that layout of the necessary number of shooting frames 803 has been completed, the flow advances to step S703. In a case where determination is made that layout of the necessary number of shooting frames 803 has not been completed, the flow advances to step S701.

In the example in FIGS. 8A and 8B, the processing of step S701 and step S702 is repeated until layout of four shooting frames 803 (shooting frames 803-1 to 803-4) is completed. In the first embodiment, completion of layout of the shooting frame 402 is determined by whether or not the user 405 has performed a dedicated hand gesture, for example. In the second embodiment, completion of layout of the shooting frames 803 may be determined in accordance with whether or not an upper limit of a layout number has been reached, speech of the user 405, or time after layout of the shooting frames 803. The computing unit 101 holds information of the shooting frames 803-1 to 803-4 (information of position, orientation, and shape of the shooting frames 803-1 to 803-4) in the primary storage unit 104. Also, the computing unit 101 outputs the shooting frames 803-1 to 803-4 to the display unit 11. Thus, the display unit 11 displays the shooting frames 803-1 to 803-4 as if the shooting frames 803-1 to 803-4 were superimposed on real space.

In step S703, the computing unit 101 continues to display the plurality of shooting frames 803 that are laid out by the same method as in step S304. At this time, the in a case where at least one of the subjects 802-1 to 802-4 is inside of a given shooting frame 803, the computing unit 101 may perform frame adjusting processing (processing for changing the color, line width, or the like, of the shooting frame 803) in accordance with the subject 802 inside of this shooting frame 803.

In step S704, the computing unit 101 controls the three-dimensional space recognizing unit 17 and detects a hand gesture of the user 405. The computing unit 101 selects a shooting frame 804 that is to be used for processing in steps S305 and thereafter, out of the shooting frames 803-1 to 803-4, on the basis of the hand gesture that is detected. At this time, the computing unit 101 may perform processing such as differentiating the color or line width of the shooting frames (shooting frame processing), between the shooting frame 804 that is selected and the shooting frames 805-1 to 805-3 that are not selected, as illustrated in FIG. 8B.

Note that while the number of the shooting frame 804 that is selected is one in the second embodiment, a plurality of the shooting frames 804 may be selectable. Also, the computing unit 101 may select the shooting frames 804 in accordance with whether or not any one of the subjects 802-1 to 802-4 is inside of the shooting frames 803-1 to 803-4, or the like. Determination regarding whether or not any one of the subjects 802-1 to 802-4 is inside of the shooting frames 803-1 to 803-4 can be realized by known subject detection processing or image determination processing.

Step S705 is started upon determination being made in step S307 that an instruction relating to shooting has been performed. In step S705, the computing unit 101 performs processing in accordance with the instruction relating to shooting. The computing unit 101 performs shooting of the range of the real space indicated by the shooting frame 804 that is selected, by the same method as in step S308, for example. Also, the computing unit 101 performs image processing with respect to the shot image in which the range of the real space indicated by the shooting frame 804 is shot. At this time, the computing unit 101 may determine parameters for shooting and parameters for image processing on the basis of the range of real space indicated by the shooting frames 805-1 to 805-3 that are not selected, in addition to the range of real space indicated by the shooting frame 804.

According to the second embodiment, the HMD can continue to display the plurality of shooting frames for a predetermined amount of time after displaying the plurality of shooting frames in accordance with the plurality of times of hand gestures. Thus, the user can select one or a plurality of shooting frames, performing shooting in accordance with the selected shooting frames, and perform shooting using parameters that take into consideration the plurality of shooting frames. Accordingly, an image of a composition that is in accordance with the intent of the user, and an image according to intended parameters, can be acquired.

Third Embodiment

In the first embodiment and the second embodiment, the HMD 1 displays the shooting frame at the position of the hand gesture for the trimming pose for at least a predetermined amount of time, even when the user disengages the trimming pose following displaying the shooting frame. In a third embodiment, the HMD 1 displays (lays out) the shooting frame at a position in accordance with a selection made by the user.

Description will be made in detail below regarding just points of difference between the third embodiment and the first embodiment (or the second embodiment).

Figure 9:
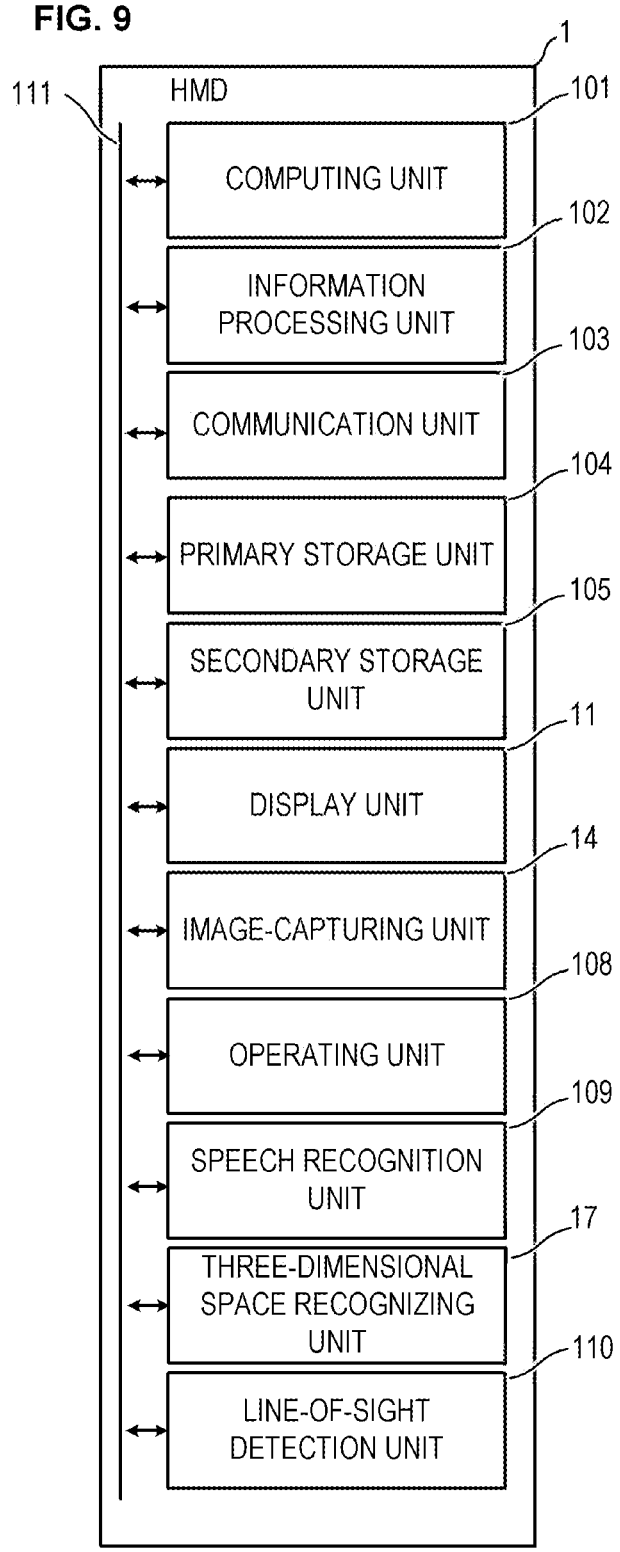
FIG. 9 is a hardware configuration diagram of an HMD according to a third embodiment.

FIG. 9 illustrates a hardware configuration of the optical see-through-type HMD 1 according to the third embodiment. The HMD 1 according to the third embodiment includes, in addition to the configuration of the HMD 1 according to the first embodiment, a line-of-sight detection unit 110. The line-of-sight detection unit 110 includes a dichroic mirror, an imaging lens, a line-of-sight detection sensor, an infrared light-emitting diode, and so forth. The line-of-sight detection unit 110 detects the orientation of the line of sight of the user 405 (the direction in which the user 405 is looking), and the gaze point position of the user 405 (the position that the user 405 is viewing).

Shooting control by hand gestures according to the third embodiment will be described with reference to the flowchart in FIG. 10. Also, FIGS. 11A to 11E and FIG. 12 are schematic diagrams illustrating relations between positions of hands of the user 405 and positions of the shooting frame 402 in the AR space according to the third embodiment. FIGS. 11A to 11E are schematic diagrams of the shooting frame 402 as viewed from the user 405 wearing the HMD 1. FIG. 12 is a schematic diagram viewing the user 405 wearing the HMD 1 and the shooting frame 402 from the side thereof.

In the third embodiment, in a case of a trimming pose being made by the right hand 403 and the left hand 404 of the user 405, the HMD 1 generates the rectangular shooting frame 402 defined by a diagonal line connecting the right hand 403 and the left hand 404 at a position away from the right hand 403 and the left hand 404.

Figure 11A:
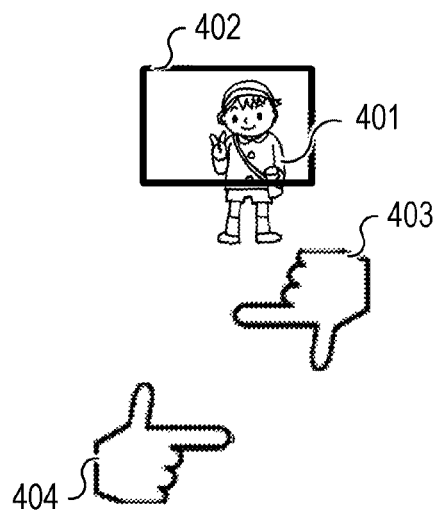
FIGS. 11A to 11E are diagrams for describing a shooting frame according to the third embodiment.
Figure 12:
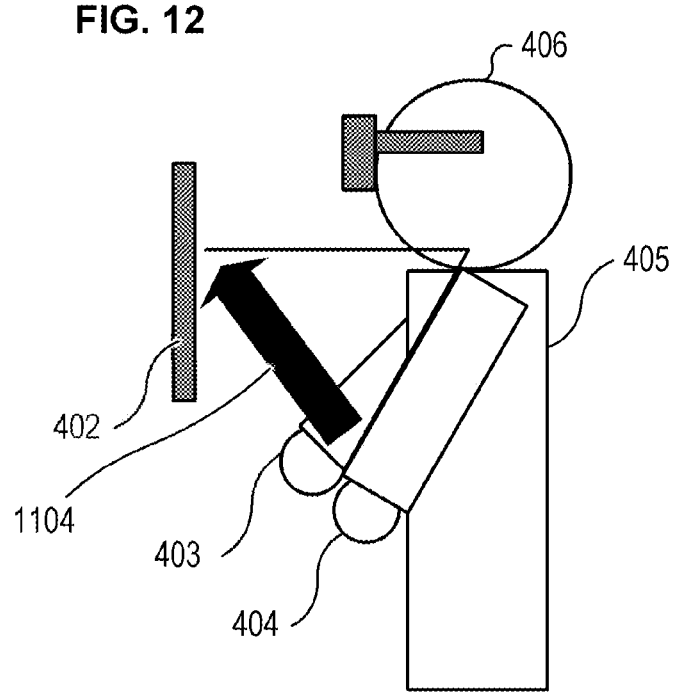
FIG. 12 is a diagram illustrating a relation between the shooting frame according to the third embodiment and the user.

For example, as illustrated in FIG. 11A, even when a trimming pose is formed downward from the position of the subject 401, the HMD 1 generates the shooting frame 402 at a position including the subject 401 that is upward from the position of the trimming pose. Thus, fatigue of the arms of the user 405 making the trimming pose is reduced.

Figure 10:
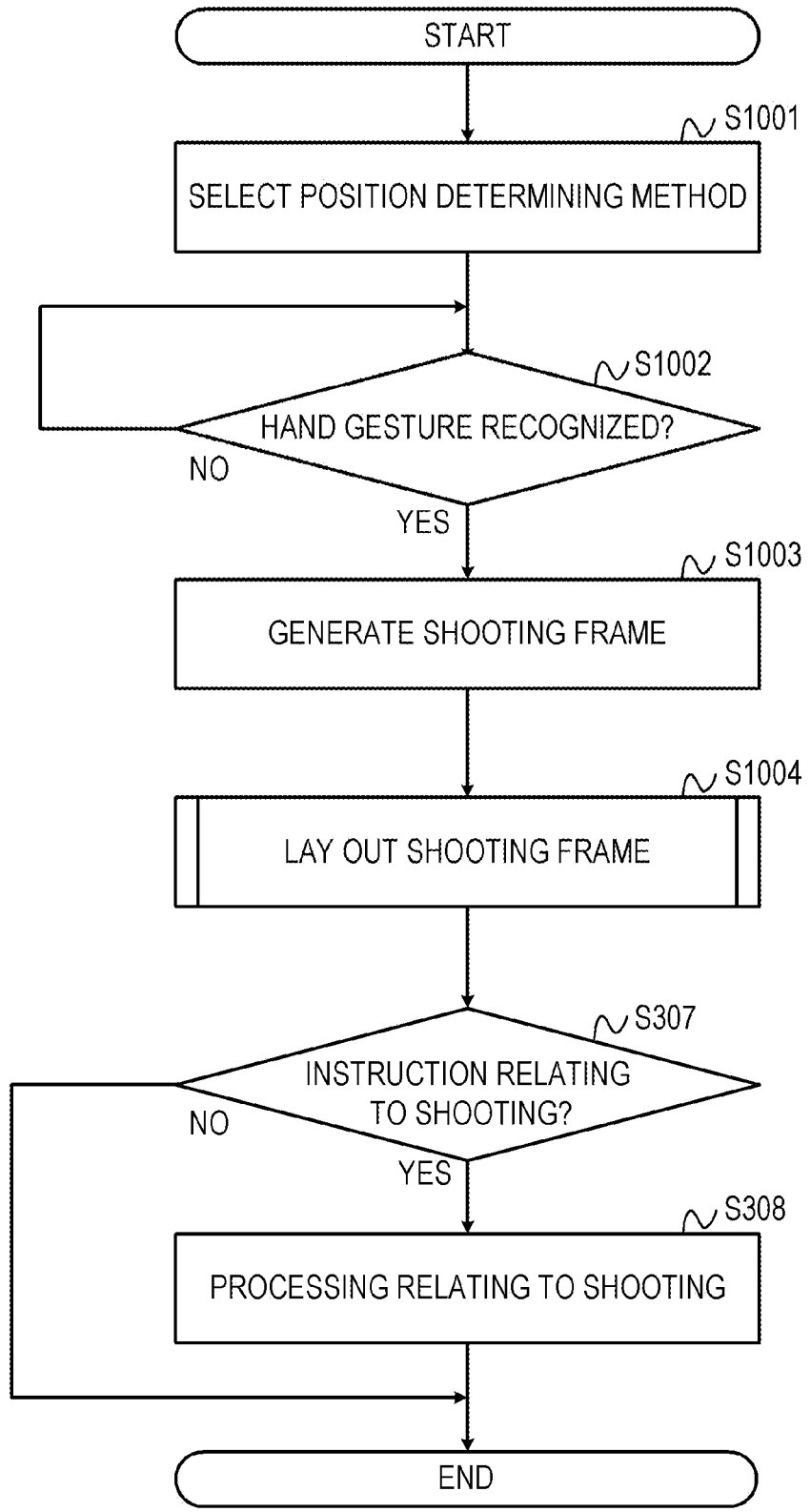
FIG. 10 is a flowchart of shooting control processing according to the third embodiment.

The processing of the flowchart in FIG. 10 is started upon the user 405 operating the operating unit 108 of the HMD 1 and the HMD 1 being set to shooting mode. Each of the processing in the flowchart in FIG. 10 is realized by the computing unit 101 of the HMD 1 executing a program. Note that steps S307 and S308 according to the third embodiment are the same as S307 and S308 according to the first embodiment, and accordingly description will be omitted.

In step S1001, the computing unit 101 selects a method for determining a position for displaying the shooting frame 402 (hereinafter referred to as "position determining method"). In the third embodiment, the computing unit 101 selects the position determining method from among a "method using gaze point position", a "method using position of HMD 1", a "method using fixed angle", and a "method using position of primary subject in field of view", in accordance with selection by the user 405.

The display unit 11 displays an operating screen in which are laid out selection option buttons representing the plurality of selection options for the position determining method. The computing unit 101 then selects the position determining method corresponding to the selection option button at the position touched by the user 405 when the operating screen is displayed. Information of the position determining method selected by the user 405 is held in the secondary storage unit 105. Note that instead of the user 405 selecting the position determining method, the computing unit 101 may select the position determining method on the basis of amount of movement of the gaze point position of the user 405, the distance to the primary subject, or the like. For example, in a case where the amount of movement of the gaze point position of the user 405 is greater than a predetermined amount, there is a possibility that the user 405 is tracking a certain object with the line of sight, and accordingly the computing unit 101 selects the "method using gaze point position" as the position determining method.

In step S1002, the computing unit 101 performs recognition of the hand gesture for a trimming pose made by the user 405. In the first embodiment, an example is described in which the hand gesture of the user 405 is recognized by the three-dimensional space recognizing unit 17, but an example of recognizing the hand gesture by image recognition will be described in the third embodiment. Note that the computing unit 101 may recognize the hand gesture using the three-dimensional space recognizing unit 17, in the same way as in the first embodiment.

In step S1002, the computing unit 101 determines whether or not the shape of the hand gesture for the trimming pose that is registered in advance, and the shape of the hand gesture that is recognized match. In a case of a trimming pose being made by the right hand 403 and the left hand 404 as illustrated in FIG. 11A, the computing unit 101 determines whether or not the shape of the hand gesture that is recognized and the shape of the hand gesture for the trimming pose that is registered in advance match. In a case where determination is made that the shapes of the two match, the flow advances to step S1003. In a case where determination is made that the shapes of the two do not match, the processing of step S1002 is repeated.

In step S1003, the computing unit 101 generates the shooting frame 402 in accordance with the hand gesture.

In a case of a trimming pose being made by the right hand 403 and the left hand 404 of the user 405 as illustrated in FIGS. 11A and 12, the computing unit 101 generates the rectangular shooting frame 402 defined by a diagonal line connecting the right hand 403 and the left hand 404. Information of the shooting frame 402 that is generated (information of position, orientation, and shape of the shooting frame 402) is held in the primary storage unit 104.

In step S1004, the computing unit 101 displays (lays out) the shooting frame 402 on the display unit 11, on the basis of the position determining method that is selected in step S1001.

Details of the processing in step S1004 will be described below with reference to the flowchart in FIG. 13.

In step S1301, the computing unit 101 determines whether or not the user 405 has selected the "method using gaze point position" as the position determining method. In a case of determination that the "method using gaze point position" has been selected, the flow advances to step S1302. In a case of determination that the "method using gaze point position" has not been selected, the flow advances to step S1304.

In step S1302, the computing unit 101 detects the gaze point position of the user 405. Specifically, the computing unit 101 detects the position (the position on the display unit 11) that the user 405, having the HMD 1 in proximity to the eyes, is viewing, by the line-of-sight detection unit 110. The computing unit 101 then detects the position (the position on the display unit 11) that the user 405 is viewing as the gaze point position.

In step S1303, the computing unit 101 lays out (displays) the shooting frame 402 at the gaze point position of the user 405.

Figure 11B:
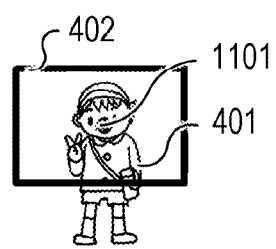

FIG. 11B is a schematic view of the shooting frame 402 as seen from the user 405, when laying out the shooting frame 402 at the gaze point position of the user 405. As illustrated in FIG. 11B, the computing unit 101 displays the shooting frame 402 on the display unit 11 such that a gaze point position 1101 of the user and a position of the center of the shooting frame 402 match. Accordingly, the user 405 can perceive that the shooting frame 402 is laid out in the real space (AR space).

In step S1304, the computing unit 101 determines whether or not the user 405 has selected the "method using position of HMD 1" as the position determining method. In a case of determination that the "method using position of HMD 1" has been selected, the flow advances to step S1305. In a case of determination that the "method using position of HMD 1" has not been selected, the flow advances to step S1307.

In step S1305, the computing unit 101 detects the position of the center of the display unit 11 of the HMD 1.

In step S1306, the computing unit 101 lays out (displays) the shooting frame 402 at the position of the center of the display unit 11 of the HMD 1.

Figure 11C:
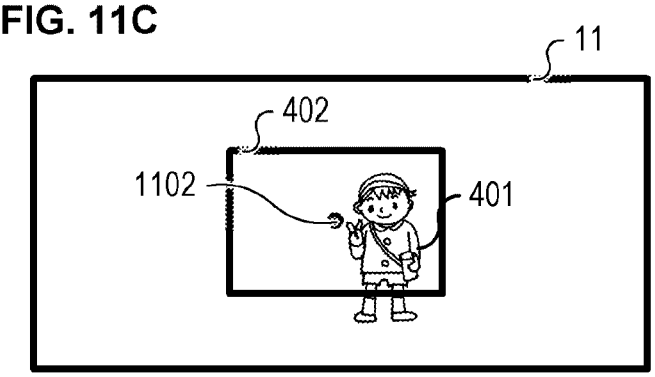

FIG. 11C is a schematic view of the shooting frame 402 as seen from the user 405, when laying out the shooting frame 402 at the position at the center of the display unit 11. As illustrated in FIG. 11C, the computing unit 101 displays the shooting frame 402 such that a position 1102 of the center of the display unit 11 and the position of the center of the shooting frame 402 match. Accordingly, the user 405 can perceive that the shooting frame 402 is laid out in the real space.

In step S1307, the computing unit 101 determines whether or not the user 405 has selected the "method using fixed angle" as the position determining method. In a case of determination that the "method using fixed angle" has been selected, the flow advances to step S1308. In a case of determination that the "method using fixed angle" has not been selected, the flow advances to step S1310.

In step S1308, the computing unit 101 acquires information of a fixed angle that is stored in the secondary storage unit 105 in advance.

In step S1309, the computing unit 101 lays out (displays) the shooting frame 402 at a "position that is distanced from the position of the hand gesture by a particular distance in a direction of a fixed angle (set in advance) in the AR space" (see FIG. 12). That is to say, the computing unit 101 lays out (displays) the shooting frame 402 at a position on the display unit 11 corresponding to the "position that is distanced from the position of the hand gesture by a particular distance in a direction of a fixed angle in the AR space". Specifically, the computing unit 101 displays the shooting frame 402 on the display unit 11 such that by viewing the display unit 11, the user 405 can perceive that the shooting frame 402 is laid out at a position that is distanced from the position of the hand gesture by the particular distance in the direction of the fixed angle.

Figure 11D:
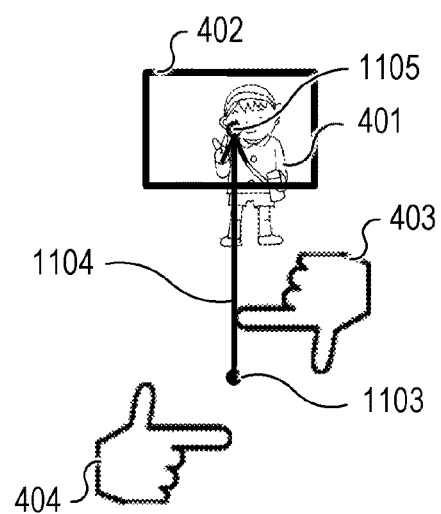

FIG. 11D is a schematic view of the shooting frame 402 as seen from the user 405, when laying out the shooting frame 402 at a position in the direction of the fixed angle from the position of the hand gesture. As illustrated in FIG. 11D, the computing unit 101 displays the shooting frame 402 on the display unit 11 such that a "position 1105 that is distanced from a position 1103 of the hand gesture by a distance 1104 in a direction of a fixed angle" and the "position of the center of the shooting frame 402" match in the AR space. Accordingly, the user 405 can perceive that the shooting frame 402 is laid out in the real space.

In step S1310, the computing unit 101 determines whether or not the user 405 has selected the "method using position of primary subject in field of view" as the position determining method. In a case of determination that the "method using position of primary subject in field of view" has been selected, the flow advances to step S1311. In a case of determination that the "method using position of primary subject in field of view" has not been selected, the flow advances to step S1001.

In step S1311, the computing unit 101 detects the position of the primary subject in the field of view.

Figure 11E:
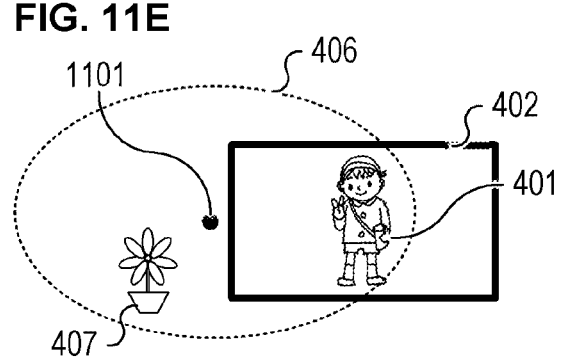

FIG. 11E is a schematic view of the shooting frame 402 as seen from the user 405, when laying out the shooting frame 402 at the position of the primary subject in the field of view. When calculating position information of the primary subject in the field of view, first, the computing unit 101 finds the gaze point position 1101 of the user. That is to say, the computing unit 101 acquires the position of the display unit 11 that the user 405, having the HMD 1 in proximity to the eyes, is viewing, as the gaze point position 1101, using the line-of-sight detection unit 110.

Next, the computing unit 101 determines whether or not a primary subject is present within a field-of-view region 406 of the user 405. The field-of-view region 406 of the user 405 is a circular region centered on the position of the gaze point position 1101 of the user, for example. In FIG. 11E, the subject 401 and an object 407 are present in the field-of-view region 406. The computing unit 101 determines whether or not a primary subject is present by whether or not a "subject having a shape that matches a shape of a primary subject registered in advance" is present in the field-of-view region 406. The example in FIG. 11E illustrates a case where a person is registered in advance as the primary subject, and the computing unit 101 determines that the subject 401 that matches the shape of a person is present in the field-of-view region 406. The computing unit 101 then calculates the position of the subject 401 determined to be the primary subject on the display unit 11 to be the position of the primary subject in the field of view.

In step S1312, the computing unit 101 lays out (displays) the shooting frame 402 at a position indicating the primary subject within the field of view on the display unit 11. For example, the computing unit 101 lays out the shooting frame 402 such that the entire boundary of the subject 401 that is determined to be the primary subject is within the shooting frame 402, as illustrated in FIG. 11E. Accordingly, the user 405 can perceive that the shooting frame 402 is laid out in the real space.

As described above, according to the third embodiment, the HMD 1 can lay out (display) the shooting frame at a position away from the position of the hand gesture. Thus, the user can perform posing by hand gestures in a state with the arms lowered, and accordingly, images of intended compositions can be acquired in a state where fatigue and load on the arms are reduced.

According to the present invention, realization of processing intended by the user can be realized through particular hand gestures.

Although the present invention has been described in detail above by way of preferred embodiments, the present invention is not limited to these particular embodiments, and various forms made without departing from the spirit and scope of the invention are encompassed by the present invention. Part of the above-described embodiments may be combined as appropriate.

Also, in the above, "in a case where A is no less than B, the flow advances to step S1, and in a case where A is smaller than (lower than) B, the flow advances to step S2" may be reread as "in a case where A is greater (higher) than B, the flow advances to step S1, and in a case where A is not more than B, the flow advances to step S2". Conversely, "in a case where A is greater (higher) than B, the flow advances to step S1, and in a case where A is not more than B, the flow advances to step S2" may be reread as "in a case where A is no less than B, the flow advances to step S1, and in a case where A is smaller than (lower than) B, the flow advances to step S2". Accordingly, to the extent that no contradiction arises, the expression "no less than A" may be reread as "greater (higher, longer, more) than A", and the expression "not more than A" may be reread with "smaller (lower, shorter, less) than A". Also, "greater (higher, longer, more) than A" may be reread as "no less than A", and "smaller (lower, shorter, less) than A" may be reread as "not more than A".

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-104852, filed on Jun. 27, 2023, which is hereby incorporated by reference herein in its entirety.

What is claimed is:

1. An information processing device that is capable of causing a user to visually recognize a real space via a display, the information processing device comprising at least one processor capable of causing the information processing device to:
perform recognizing processing to recognize a particular hand gesture performed by the user,
perform display control processing to 1) display a first frame in accordance with the particular hand gesture on the display, and 2) continue displaying the first frame for at least a predetermined amount of time after the particular hand gesture is recognized, even in a case where a state transitions to a state where the particular hand gesture is not recognized after the first frame is displayed, and
in a state where the first frame is displayed on the display, execute particular processing with regard to a range of the real space indicated by the first frame out of the real space,
wherein the display is included in a display device worn on a head of the user, and
wherein in the display control processing, in a state where the first frame is displayed, the first frame continues to be displayed such that the user perceives the first frame to be moving in the real space in accordance with change in orientation of the head.

2. The information processing device according to claim 1, wherein the particular processing is processing of shooting the range of the real space indicated by the first frame.

3. The information processing device according to claim 1, wherein in display control processing, a position, an orientation, and a shape of the first frame are edited, in accordance with an instruction from the user.

4. The information processing device according to claim 1, wherein in the display control processing, in the state where the first frame is displayed, 1) the first frame continues to be displayed until a particular condition is satisfied, and 2) the first frame is hidden in a case where the particular condition is satisfied.

5. The information processing device according to claim 4, wherein the particular condition being satisfied is for a particular instruction to be given by the user operating an operating member.

6. The information processing device according to claim 4, wherein the particular condition being satisfied is for a particular instruction to be given by voice uttered by the user.

7. The information processing device according to claim 4, wherein the particular condition being satisfied is for a particular instruction to be given by a hand gesture of the user.

8. The information processing device according to claim 4, wherein the particular condition being satisfied is for a certain amount of time to elapse after display of the first frame is started.

9. The information processing device according to claim 1, wherein in the display control processing, in a case where the particular hand gesture is recognized, the first frame is displayed at a position on the display corresponding to a position of the particular hand gesture that is recognized.

10. The information processing device according to claim 1, wherein in the display control processing, in a case where the particular hand gesture is recognized, the first frame is displayed at a position determined by a method selected from a plurality of methods.

11. The information processing device according to claim 10, wherein the plurality of methods include a method of displaying the first frame at a position that the user is viewing on the display.

12. The information processing device according to claim 10, wherein the plurality of methods include a method of displaying the first frame at a position at a center of the display.

13. The information processing device according to claim 10, wherein the plurality of methods include a method of displaying the first frame at a position that shows a particular subject in a field-of-view region of the user.

14. An information processing device that is capable of causing a user to visually recognize a real space via a display, the information processing device comprising at least one processor capable of causing the information processing device to:
perform recognizing processing to recognize a particular hand gesture performed by the user,
perform display control processing to 1) display a first frame in accordance with the particular hand gesture on the display, and 2) continue displaying the first frame for at least a predetermined amount of time after the particular hand gesture is recognized, even in a case where a state transitions to a state where the particular hand gesture is not recognized after the first frame is displayed, and
in a state where the first frame is displayed on the display, execute particular processing with regard to a range of the real space indicated by the first frame out of the real space,
wherein, in the recognizing processing, the particular hand gestures performed a plurality of times by the user are recognized,
wherein, in the display control processing, a plurality of frames in accordance with the plurality of times of the particular hand gesture continue to be displayed on the display, for at least the predetermined amount of time after the plurality of times of the particular hand gesture are recognized, and wherein, after the first frame is selected from out of the plurality of frames, the particular processing is executed with regard to the range of the real space indicated by the first frame out of the real space, in the state where the first frame is displayed on the display.

15. The information processing device according to claim 14, wherein a parameter relating to the particular processing is determined, on a basis of the plurality of frames.

16. The information processing device according to claim 14, wherein in the display control processing,
in a state where the first frame is displayed, the first frame continues to be displayed such that the user perceives the first frame to be fixed at a same position in the real space.

17. An information processing device that is capable of causing a user to visually recognize a real space via a display, the information processing device comprising at least one processor capable of causing the information processing device to
perform recognizing processing to recognize a particular hand gesture performed by the user,
perform display control processing to 1) display a first frame in accordance with the particular hand gesture on the display, and 2) continue displaying the first frame for at least a predetermined amount of time after the particular hand gesture is recognized, even in a case where a state transitions to a state where the particular hand gesture is not recognized after the first frame is displayed, and
in a state where the first frame is displayed on the display, execute particular processing with regard to a range of the real space indicated by the first frame out of the real space,
wherein, in the display control processing, in a case where the particular hand gesture is recognized, the first frame is displayed at a position determined by a method selected from a plurality of methods, and
wherein the plurality of methods include a method of displaying the first frame at a position on the display that corresponds to a position in a direction of an angle, set in advance, from a position of the particular hand gesture.

18. An information processing method that is capable of causing a user to visually recognize a real space via a display, the information processing method comprising:
recognizing a particular hand gesture performed by the user;
performing display control of 1) displaying a first frame in accordance with the particular hand gesture on the display, and 2) continuing displaying the first frame for at least a predetermined amount of time after the particular hand gesture is recognized, even in a case where a state transitions to a state where the particular hand gesture is not recognized in the recognizing after the first frame is displayed; and
performing processing of, in a state where the first frame is displayed on the display, executing particular processing with regard to a range of the real space indicated by the first frame out of the real space,
wherein the display is included in a display device worn on a head of the user, and
wherein, in the performing display control, in a state where the first frame is displayed, the first frame continues to be displayed such that the user perceives the first frame to be moving in the real space in accordance with change in orientation of the head.

19. A non-transitory computer readable medium that stores a program, wherein the program causes a computer to execute an information processing method that is capable of causing a user to visually recognize a real space via a display, the information processing method comprising:
recognizing a particular hand gesture performed by the user;
performing display control of 1) displaying a first frame in accordance with the particular hand gesture on the display, and 2) continuing displaying the first frame for at least a predetermined amount of time after the particular hand gesture is recognized, even in a case where a state transitions to a state where the particular hand gesture is not recognized in the recognizing after the first frame is displayed; and
performing processing of, in a state where the first frame is on the display, executing particular processing with regard to a range of the real space indicated by the first frame out of the real space,
wherein the display is included in a display device worn on a head of the user, and
wherein, in the performing display control, in a state where the first frame is displayed, the first frame continues to be displayed such that the user perceives the first frame to be moving in the real space in accordance with change in orientation of the head.

* * * * *